United States Patent [19]

Lamparter

[11] 4,061,948
[45] Dec. 6, 1977

[54] APPARATUS FOR RE-TRANSFERRING POWER FROM MECHANICALLY DRIVEN AND/OR ELECTRICALLY BRAKED MOTORS OF SPINNING MACHINES

[75] Inventor: Hansruedi Lamparter, Winterthur, Switzerland

[73] Assignee: Rieter Machine Works, Ltd., Winterthur, Switzerland

[21] Appl. No.: 576,876

[22] Filed: May 12, 1975

[30] Foreign Application Priority Data

May 20, 1974 Switzerland ............... 6874/74

[51] Int. Cl.² ............................................. H02P 7/70
[52] U.S. Cl. .................................... 318/87; 318/112; 318/254; 318/376
[58] Field of Search .......................... 318/86–88, 318/254, 376, 49, 50, 112

[56] References Cited

U.S. PATENT DOCUMENTS

| 2,070,473 | 2/1937 | Currier | 318/87 |
| 2,773,228 | 12/1956 | Moore et al. | 318/87 |
| 3,538,404 | 11/1970 | Risberg | 318/376 X |
| 3,601,670 | 8/1971 | Eriksson et al. | 318/376 X |
| 3,890,551 | 6/1975 | Plunkett | 318/376 |

Primary Examiner—Robert J. Hickey
Attorney, Agent, or Firm—Kenyon & Kenyon, Reilly, Carr & Chapin

[57] ABSTRACT

The electrical circuit between the power supply line and each motor or motor pair has an apparatus for re-transferring power from one mechanically driven and/or electrically braked motor to another of the motors. This apparatus includes a levelling or equalizing circuit and a plurality of back coupling devices such as diodes arranged in opposition in series. Each back coupling device electrically connects the intermediate DC circuit loosely to the levelling circuit. Upon braking of a motor, the power flows back through the associated intermediate circuit and then via the back coupling devices and levelling circuit to the other motors.

10 Claims, 6 Drawing Figures

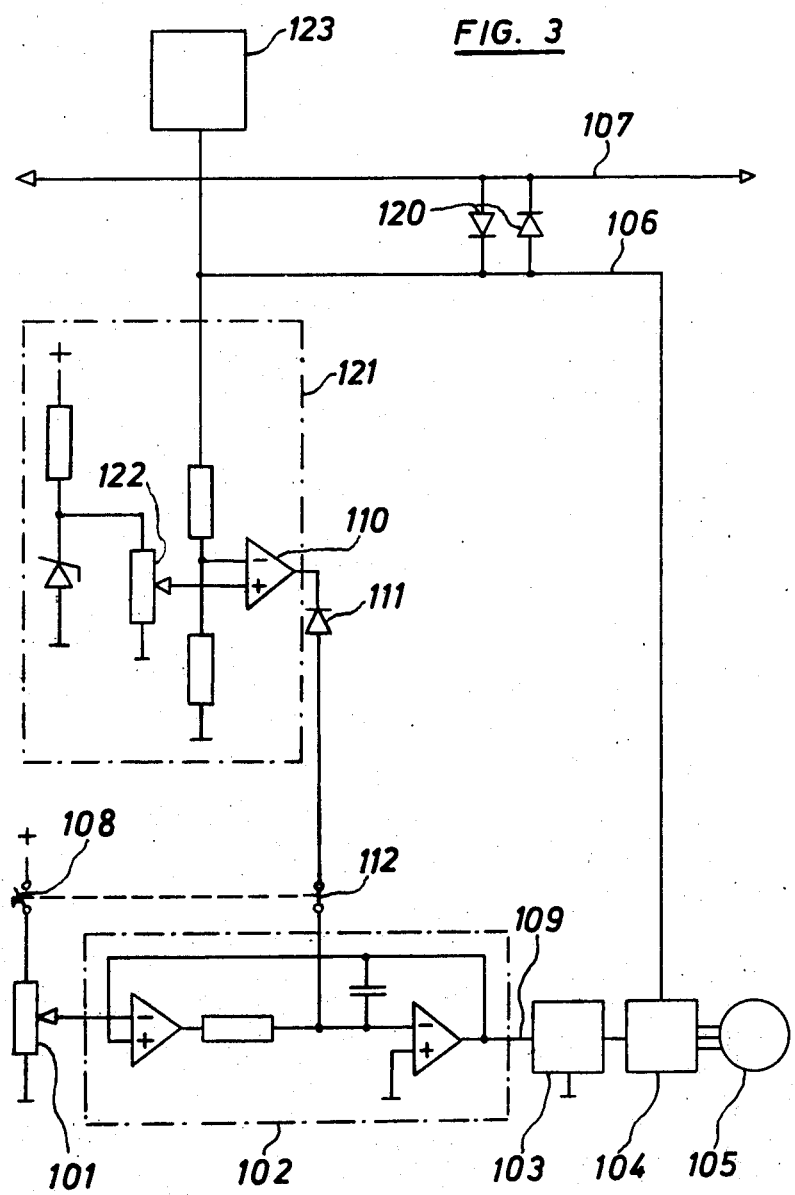

APPARATUS FOR RE-TRANSFERRING POWER FROM MECHANICALLY DRIVEN AND/OR ELECTRICALLY BRAKED MOTORS OF SPINNING MACHINES

This invention relates to spinning machines and particularly to an apparatus for transferring power from one motor to another in a spinning machine such as a spin-draw-machine, a spin-winding machine or a spin-draw-winding machine.

As is known, most static frequency inverters basically consist of an AC to DC rectifier, which transforms the AC power of a power supply line into a DC power, and of a DC to AC convertor, which chops the DC power into an AC power again of the desired frequency. The power thus flows from the power supply line via the AC to DC rectifier and the DC to AC converter to a motor which delivers the power in the form of mechanical power.

If for any reason the power flow is reversed, e.g. as the motor is driven mechanically, the power flows back via the converter into the intermediate DC circuit, but from there as a rule the power cannot be re-transferred to the power supply line. The power thus accumulates in the intermediate DC circuit, which results in an increase in the DC voltage which can destory the apparatus.

These above conditions occur in drive systems of spinning machines, e.g. in drive systems for drawing units which draw synthetic threads, and particularly in motors which drive draw-rolls which are used for retaining the thread running over them, and which, thus, are driven by the thread.

Similar conditions prevail on winding machine thread traversing drives, the rotational speed of which is wobbled. That is, each time the rotational speed is slowed down, the drive motor slows the fly wheel mass of the thread traversing device and re-transfers the corresponding power via the converter to the intermediate DC circuit.

In order to avoid undesirable voltage increases in the intermediate DC circuit, devices are known which — if the voltage exceeds a desirable level — drain this excessive power via a resistor or re-transfer the excessive power via a control device of the rectifier to the power supply line. In the first case, the excess power is destroyed uselessly, whereas in the second case very expensive control devices are needed.

In drive systems on machines for processing synthetic threads one rectifier is always connected with a plurality of converters in the same system. Of these converters, in most cases, only a few re-transfer power. In this arrangement of a rectifier with a common intermediate DC circuit for a plurality of converters, the power re-transferred from one converter can be transferred to another converter requiring power in such manner that an excessive voltage increase is also avoided.

In the above-mentioned drive systems, an individual converter always drives a plurality of motors. If one of these motors is to be stopped, it is electrically separated from the converter and, as a rule, is supplied with DC current or with three-phase AC current the sense of rotation of which is reversed. This mode of braking a motor, however, requires a very expensive control arrangement and requires additional power.

A more elegant mode of braking motors resides in the continuous reduction of the frequency of the converter towards zero. In this manner, the motor can give off the rotational power of the machine element connected thereto via the converter to the intermediate DC circuit. Also, the motor temperature is increased considerably less than in the case in which additional energy for braking is supplied to the motor. This power-saving mode of braking motors, however, implies, that either all motors supplied by one converter and braked simultaneously or that each motor or each group of functionally cooperating motors is provided with an individual converter. In this case also, a common intermediate DC circuit is required through which power can be exchanged.

This last mentioned drive system shows as a disadvantage that, in case of disorders in the common rectifier connected with the intermediate DC circuit, the whole drive system is put out of operation. This can result in very expensive down time of the machine. A further disadvantage is seen in that in the layout and in manufacturing of the frequency inverter, calculations, design and manufacture of the rectifier are to be individually adapted for each plant according to the number of converters to be used, while the converters can be standardized units.

Accordingly, it is an object of the invention to create an apparatus in which any one of the motors or any group of motors can be braked with the power being re-transferred.

Briefly, the invention is directed to a combination which includes a plurality of motors for a spinning machine, an AC power supply line for supplying power to the motors and a plurality of electrical circuits each of which connects at least one of the motors to the supply line and which includes a rectifier connected to the supply line, an intermediate DC circuit and a corresponding converter. In accordance with the invention this combination includes an apparatus for re-transferring power from at least one of the motors to another motor in response to a mechanical driving and/or electrical braking of the motor. This apparatus includes a power transfer or equalizing circuit and bi-directional coupling devices each of which electrically connects an intermediate DC circuit loosely to the power equalizing circuit.

The bi-directional coupling device in the simplest arrangement can consist of a constant or voltage-dependent resistor. Preferably, however, two diodes arranged antiparallel or two Zener diodes opposed in series are used for establishing the loose coupling between the converter under normal operating conditions and for keeping the losses to a miniumum in case of power exchanges between the converters.

In a further embodiment, an additional means for controlling the re-transfer rate is provided so that the power re-transfer from the converter is rendered controllable if in special cases the equalizing circuit cannot take-up and transfer power to other converters. Control in this arrangement can be effected continuously or discontinuously.

These and other objects and advantages of the invention will become more apparent from the following detailed description and appended claims taken in conjunction with the accompanying drawings in which:

FIG. 3 illustrates an additional device between the AC to DC converter and the DC to AC converter for decelerating the braking action.

Figure 1:
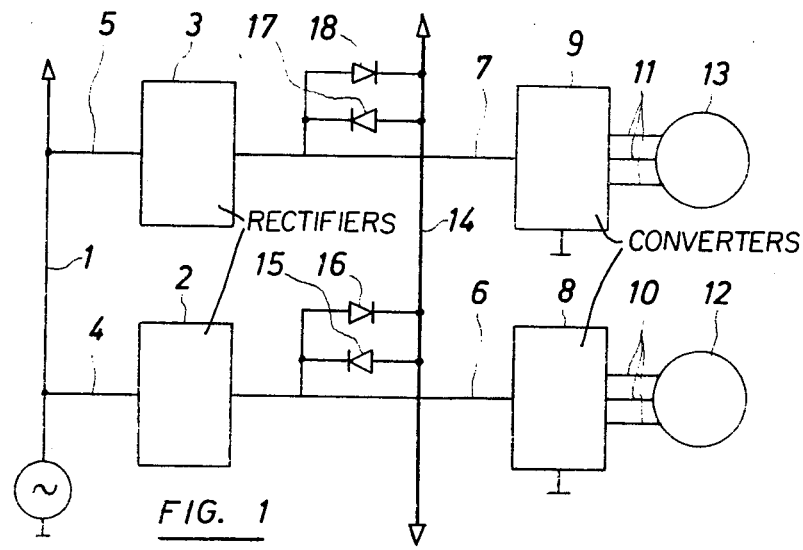
FIG. 1 illustrates a part of a simplified circuit diagram of the drive of the motors of a spinning machine in accordance with the invention.

Referring to FIG. 1, the drive system for the motors 12, 13 (only two of which are shown) of a spinning machine employ electrical circuits to connect the motors 12, 13 to a power supply line 1. Each electrical circuit uses an individual converter and a rectifier for this purpose. As shown, two AC to DC rectifiers 2 and 3 are connected via corresponding circuits 4 and 5 respectively with the power supply line 1. The rectifiers 2, 3 are also connected via corresponding intermediate DC circuits 6, 7 with corresponding means for converting DC to AC, i.e. DC to AC converters, 8, 9 which via three-phase circuits 10, 11 are connected with the corresponding motors 12, 13 (pairs of motors). A power transfer or equalizing circuit 14 which functions as a means for levelling the intermediate DC circuit is also loosely back coupled to the intermediate DC circuits 6, 7 via diodes 15, 16 and 17, 18.

If the motors 12, 13 take up power, the voltages in the two intermediate DC circuits 6, 7 are equal. Thus, no current flows in the equalizing circuit 14. The converters 8, 9 then operate entirely independently.

If, however, the motor 12 is mechanically driven or is electrically braked by frequency reduction, power flows back via the converter 8 into the intermediate DC circuit 6 in such manner that the voltage therein is increased. As the voltage exceeds the sum of the forward voltage drops of the two diodes 16 and 17, the current starts flowing from the intermediate DC circuit 6 via the diode 16, the levelling circuit 14 and diode 17 to the intermediate DC circuit 7, where the current is taken up by the converter 9 requiring power.

In the opposite case, in which the motor 13 re-transfers power, the power flows from the intermediate DC circuit 7 via the diode 18, the equalizing circuit 14 and the diode 15 into the intermediate DC circuit 6.

If for any reason the AC to DC rectifier 2 is inoperative, and can no longer supply power, the voltage in the intermediate AC circuit 6 is lowered. As soon as the voltage drops by twice the diode forward voltage drop, a levelling or compensating current starts flowing from the intermediate DC circuit 7 via the diode 18, the equalizing circuit 14 and the diode 15 to the intermediate DC circuit 6.

In the arrangement described above in which a corresponding converter and a rectifier are provided for each motor the occurrence of a machine standstill in case of disturbances in one of the rectifiers is excluded. To the contrary, the arrangement described shows the further advantage that in case an individual rectifier is out of order not even the corresponding converter is affected. This is because the DC current is supplied from the other rectifiers to the corresponding converter via the equalizing circuit.

Figure 2:
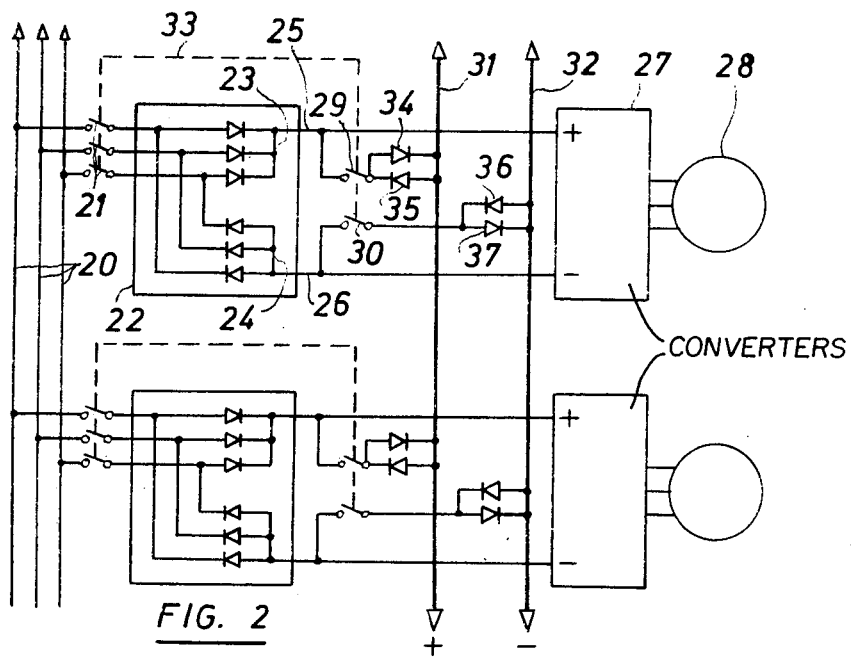
FIG. 2 illustrates a part of a circuit diagram similar to FIG. 1 wherein the connection to the power supply line uses three phases in accordance with the invention.

Referring to FIG. 2, instead of the rectifier arrangement shown simplified in FIG. 1, three-phase bridge rectifiers are normally used. In this arrangement, a two pole equalizing circuit is required. Thus e.g. a rectifier 22 is connected via a switch 21 with the three-phase AC power supply line 20. Two half bridges 23 and 24 are connected via corresponding circuits 25 and 26 with a convertor 27 which, in turn, is connected with a motor 28. The circuit 25 is connected via a switch 29 and two diodes 34, 35 with the positive equalizing circuit 31 whereas the circuit 26 is connected via a switch 30 and two diodes 36, 37 with the negative equalizing circuit 32.

The current equalizing action in this arrangement is effected in analogous manner as described with reference to FIG. 1. If all motors are taking up power, no current flows through the equalizing circuits 31, 32. If the motor 28 is mechanically driven and electrically braked, current flows via the circuit 25, the switch 29 and the diode 34 into the positive equalizing circuit 31 and via the equalizing levelling circuit 32, the diode 36, the switch 30 and the circuit 26 back to the converter 27. The power transferred to the levelling circuits 31, 32 is transferred on to a converter which takes up power. Of course, the equalizing circuits 31, 32 are connected with any desired number of convertors of which FIG. 2 only shows a part. The connection to the equalizing circuits 31, 32 can be interrupted with a main switch 33 in such manner that the converter 27 is also not supplied with power from the equalizing circuits 31, 32, if the corresponding motor is to be stopped.

Figure 1A:
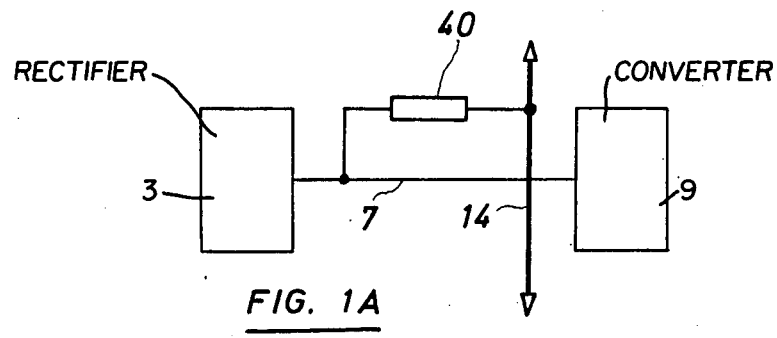
FIG. 1A illustrates a detail according to FIG. 1 with an alternative arrangement.
Figure 1B:
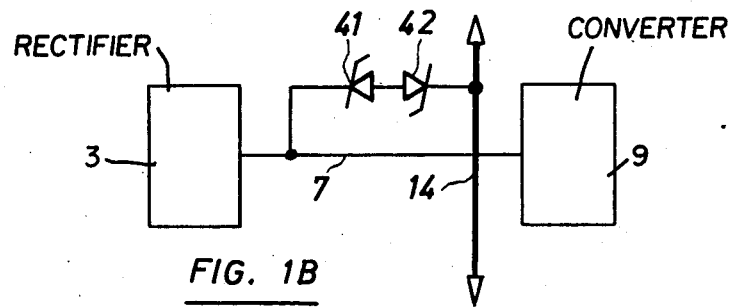
FIG. 1B illustrates the same detail as in FIG. 1A with a further alternative arrangement.

Instead of diodes in any arrangement other elements such as Zener diodes, resistors or voltage dependent resistors can also be used. Thus, in FIG. 1A a section of the arrangement according to FIG. 1 is shown in which the connection of the intermediate DC circuit 7 with the equalizing circuit 14 is established via a resistor 40, which also can be a voltage dependent resistor (VDR). In FIG. 1B showing the same section of the arrangement according to FIG. 1, the connection of the intermediate DC circuit 7 with the equalizing circuit 14 is established via two Zener diodes 41 and 42 arranged opposite in series.

If all motors of the spinning machine are stopped simultaneously, the rise in voltage in the equalizing circuit of the arrangements shown in FIGS. 1 and 2 can no longer be drained and destruction of the arrangement can occur. If this is to be avoided, the power re-transfer must be reduced or prevented. This is effected using an additional means as shown in FIG. 3. This means acts on the frequency reduction of the converter which re-transfers power in the case of a voltage increase in the intermediate DC circuit in such a manner that the amount of power re-transferred is limited. Thus, the voltage in the equalizing circuit and in the intermediate DC circuit connected thereto does not increase excessively.

As shown in FIG. 3, a simplified circuit diagram of a normal circuit used for forming the frequency of the DC to AC converter includes a frequency setting device 101, a circuit 102 effecting continuous increase or decrease, respectively, of the frequency during the start-up or the braking process, a voltage-frequency inverter 103, a converter device 104 in the proper sense and a motor 105. The converter device 104 is supplied with power from the intermediate DC circuit 106 which is connected with a rectifier 123 and with an equalizing circuit 107 via a coupling element 120.

As a switch 108 is closed, a coupled switch 112 simultaneously is opened and the voltage at the input point 109 of the voltage-frequency inverter 103 continuously increases and generates an increasing frequency in the converter 104 which accelerates the motor 105. This process prevails until the voltage at the input point 109 reaches the value pre-set on the frequency setting device 101 whereupon the voltage at the input point 109 and, thus, also the frequency at the motor 105 remains constant.

A comparator circuit 121 is also used to compare a constant voltage with the voltage prevailing in the intermediate DC circuit 106. A settable comparator voltage in generated by a stabilizing circuit and is transmitted to an amplifier 110 via a settable voltage divider 122. The voltage to be controlled of the intermediate DC circuit 106 is also transmitted via a voltage divider to the amplifier 110. If normal voltage prevails in the intermediate DC circuit 106, the output of the amplifier 110 is positively saturated and, thus, by a diode 111 is de-coupled. The output of the amplifier 110 is also de-coupled by the switch 112 from the frequency-determining circuit 102 during the start-up and operating processes.

The stoppage process of the motor 105 is initiated by opening the switch 108. The voltage at the input point 109 and, thus, also the frequency at the motor 105 continuously decreases. The rotational power to be eliminated from the motor 105 is then transformed into electrical power in the converter 104 and is transmitted into the intermediate DC circuit 106. If this power cannot be given off via the equalizing circuit 107, e.g. due to the simultaneous reduction of rotational speed of the other motors, the voltage in the intermediate DC circuit 106 increases. As the constant comparator voltage pre-set in the comparator circuit 121 is exceeded, the output voltage of the amplifier 110 decreases and influences the circuit 102 via the now transmitting diode 111 and via the closed switch 112 in such a manner that the reduction speed of the frequency and, thus, the braking of the motor 105 are reduced to such an extent that the voltage in the intermediate DC circuit 106 is not further increased. The circuit 102 in this arrangement functions continuously, i.e. maintains the voltage in the intermediate DC circuit 106 constant, until the frequency in the voltage-frequency inverter 103 has dropped to zero and the motor 105 has stopped.

Figure 3A:
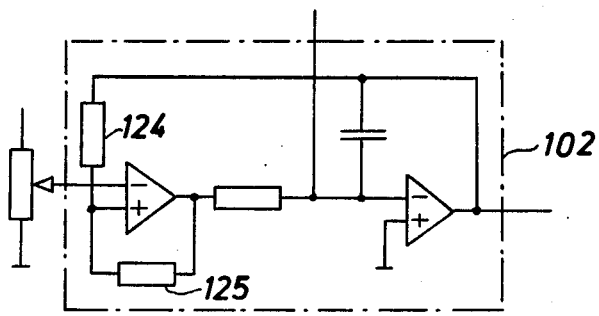
FIG. 3A illustrates a detail according to FIG. 3 with an alternative arrangement.

Referring to FIG. 3A, a discontinuous function of the circuit 102 can be effected by arranging a back-coupling element with the resistors 124 and 125. If the voltage in the intermediate DC circuit 106 exceeds the comparator voltage in the comparator circuit 121, the circuit 102 interrupts the frequency reduction in the voltage-/frequency invertor 103 and, thus, interrupts the power re-transfer into the intermediate DC circuit 106. As soon as the voltage in the intermediate DC circuit 106 is lowered below the comparator voltage, the circuit 102 effects a further reduction in frequency and, thus, further braking of the motor 105. If the voltage in the intermediate DC circuit 106 again exceeds the comparator voltage, the reduction of the frequency again is interrupted. This switching cycle repeats itself until zero frequency is reached and the motor as desired is brought to a standstill.

The invention thus provides an equalizing circuit which permits the re-transfer of the power from mechanically driven and/or electrically braked motors and the re-utilization of this power in motors taking-up electrical power. Also, if a rectifier is out of operation, the equalizing circuit permits operation of the corresponding converter and of the corresponding motor.

In the rate cases in which the equalizing circuit cannot take-up power, or in the absence of a equalizing circuit, it proves advantageous if each convertor is provided with an additional means as shown in FIG. 3, which effectively prevents damages to rectifiers and converters even if the motor braking time is increased somewhat.

The invention thus provides an apparatus for transferring power from one motor to another and may be used in spinning machines such as spin-draw-machines, spin-winding machines, and spin-draw-winding machines.

Finally, it is to be noted in FIG. 2 that the schematically illustrated components in the lower half of the Figure are identical to the components referenced in the upper half of the Figure.

What is claimed is:

1. In combination,
   a plurality of motors for a spinning machines,
   an AC power supply line for supplying power to said motors,
   a plurality of electrical circuits, each said circuit connecting at least one of said motors to said AC power supply line and including a rectifier connected to said power supply line, an intermediate DC circuit, and means for converting DC to AC, and
   an apparatus for re-transferring power from at least one of said motors to another of said motors in response to mechanical driving and/or electrical braking of said one motor, said apparatus including a power equalizing circuit, and bi-directional coupling devices electrically connecting each intermediate DC circuit loosely to said power equalizing circuit.

2. The combination as set forth in claim 1 wherein each said coupling device is a resistor, 3. The combination as set forth in claim 2 wherein said resistor is a voltage dependent resistor.

4. The combination as set forth in claim 1 wherein each said coupling device includes two diodes arranged in antiparallel relation.

5. The combination as set forth in claim 1 wherein each said coupling device includes two Zener diodes arranged opposite in series.

6. The combination as set forth in claim 1 wherein said power equalizing circuit and each said coupling device is provided in a one pole arrangement.

7. The combination as set forth in claim 1 which further comprises a means for controlling the power re-transfer rate in response to an excessive voltage increase in an intermediate DC circuit due to power re-transfer of braking power.

8. The combination as set forth in claim 7 wherein said means is a continuously operating circuit.

9. The combination as set forth in claim 7 wherein said means is a discontinuously operating circuit.

10. The combination as set forth in claim 1 wherein said power equalizing circuit and each said coupling device is provided in a two pole arrangement.

* * * * *

UNITED STATES PATENT AND TRADEMARK OFFICE
CERTIFICATE OF CORRECTION

PATENT NO. : 4,061,948
DATED : December 6, 1977
INVENTOR(S) : Hansruedi Lamparter It is certified that error appears in the above-identified patent and that said Letters Patent are hereby corrected as shown below:

Column 1, line 27 change "destory" to -- destroy --

Column 2, line 51 change "miniumum" to -- minimum --

Column 3, line 21 after "converters", delete -- , --

Column 3, line 39 change "levelling" to -- equalizing --

Column 5, line 9 change "in" to -- is --

IN THE CLAIMS
Column 6, line 21 change "machines" to -- machine --
Column 6, line 39 change "," to -- . --

Signed and Sealed this

Fourteenth Day of November 1978

[SEAL]

Attest:

RUTH C. MASON
Attesting Officer

DONALD W. BANNER
Commissioner of Patents and Trademarks